July 25, 1967  J. P. LAVASH  3,332,234
FUEL DELIVERY SYSTEMS
Filed March 24, 1966
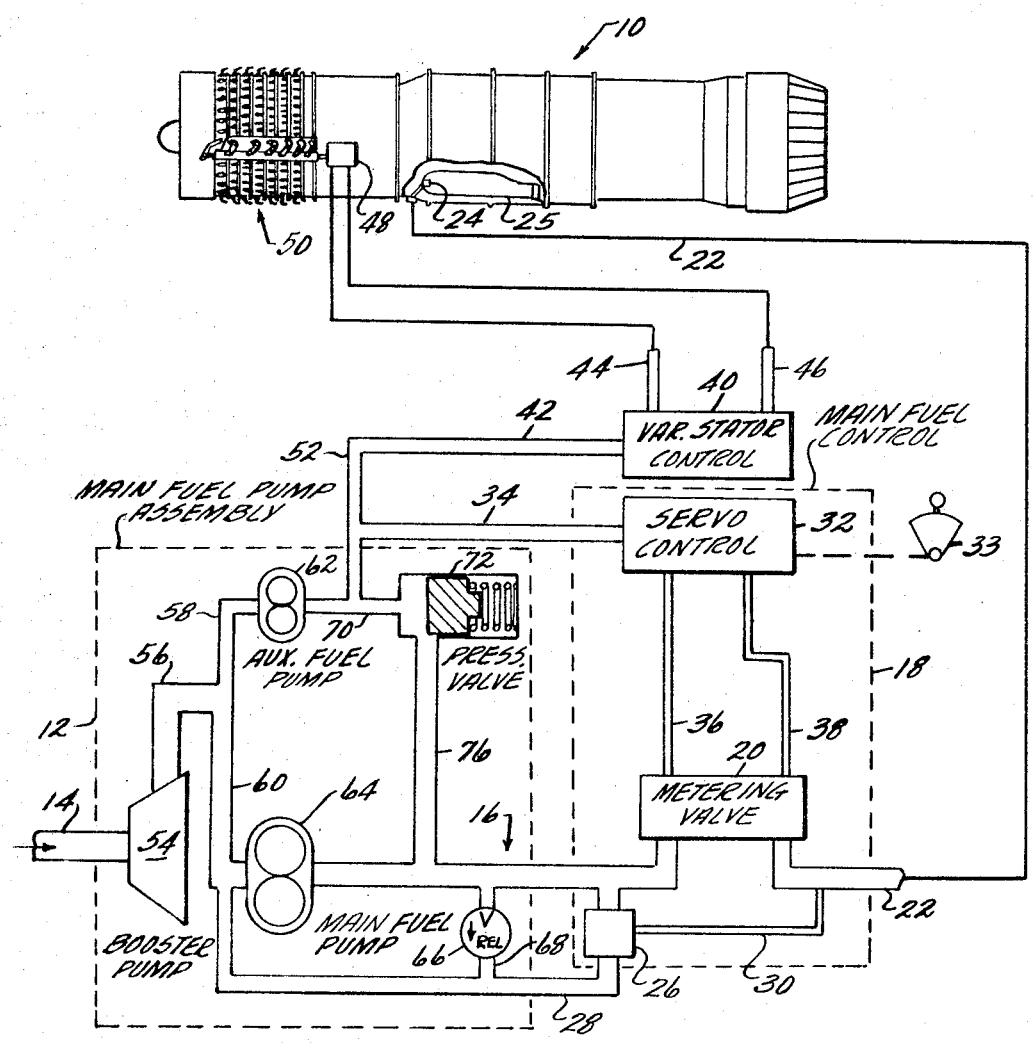
INVENTOR.
JOHN P. LAVASH
BY
ATTORNEY

3,332,234
FUEL DELIVERY SYSTEMS
John P. Lavash, Cincinnati, Ohio, assignor, by mesne assignments, to the United States of America as represented by the Secretary of the Air Force
Filed Mar. 24, 1966, Ser. No. 537,048
2 Claims. (Cl. 60—39.28)

The present invention relates to fuel delivery systems for gas turbine engines and more particularly to such systems which provide fuel for hydraulic actuation of auxiliary devices.

It is well known in the gas turbine art to utilize engine fuel for hydraulic actuation of auxiliary devices. This approach has many advantages, including simplification of parts and weight reduction. In many fuel delivery systems the fuel used for hydraulic actuation is taken from an output line of a main fuel pump.

Auxiliary devices of the type referred to usually comprise actuators in the form of a piston and cylinder which require minimum pressure levels for effective operation. This problem has been previously recognized and means providing the necessary pressure level have been incorporated in existing fuel systems.

Previous solutions to the problem, however, are inadequate where it is desired to use the fuel as a heat sink for cooling purposes because of the fact that the previous pressurizing means have themselves added significant amounts of heat to the overall fuel supply. In addition appreciable power is required to pressurize the fuel supply to the minimum levels.

Accordingly, it is an object of the present invention to minimize the heat input to the overall fuel supply in a gas turbine engine when a portion of the supply is used for hydraulic actuation of auxiliary devices, and to do so in a simplified economical fashion requiring a minimum of power.

The above object is achieved by providing a fuel delivery system for use in a gas turbine engine having fuel scheduling means requiring a supply pressure which increases with an increase of flow therethrough. The engine is also provided with hydraulically actuated auxiliary devices such as fuel controls and thrust reversers. The fuel delivery system comprises first and second fuel pumps disposed in parallel and driven by the engine at a rate which increases with an increasing rate of engine operation. Conduit means receive the discharge of the first pump to supply the fuel scheduling means. The output of the second pump is supplied, at least in part, to the auxiliary devices for hydraulic actuation thereof. Means are provided for maintaining the output pressure of the second pump above a level necessary for effective operation of the auxiliary devices. The output of the second pump not used by the auxiliary devices is directed from the pressure maintaining means to the output of the first pump.

The second pump has a flow output capacity sufficient to meet the maximum requirements of the auxiliary devices and the flow output capacity of the first and second pumps is selected to be sufficient to meet the highest demand of the fuel scheduling means, whereby when the flow through said scheduling means is relatively low and the rate of engine operation is relatively high, the heat input to the fuel is minimized in providing pressurized fuel for hydraulic actuation of the auxiliary devices.

These and other related objects and features of the invention will be apparent from a reading of the following description of the disclosure found in the accompanying drawing and the novelty thereof pointed out in the appended claims.

The single figure in the drawing is a diagrammatic illustration of a gas turbine engine in which the present invention is used.

The figure shows in block fashion a fuel delivery system for a gas turbine engine 10 used for aircraft propulsion. A fuel pump assembly 12 receives fuel from a fuel tank (not shown) by means of an inlet conduit 14 and delivers it through an outlet conduit 16 to a main fuel control 18. The main fuel control 18 comprises a variable area metering valve 20 which receives fuel from conduit 16 and schedules it for delivery through a conduit 22 to a series of combustor fuel nozzles 24 of engine 10. Fuel is then atomized and ignited in a combustor 25 by means well known to those skilled in the art to provide hot gases for operation of the engine. In order to obtain a flow through the metering valve 20 which is directly proportional to its area, a constant pressure differential is maintained thereacross. To this end a pressure regulator valve 26 bypasses fuel to a low pressure stage of the fuel pump assembly 12 to maintain the pressure in conduit 16 at a predetermined level above the pressure in conduit 22, as sensed through a conduit 30.

The area of the metering valve 20 is set by a servo control 32 which directs pressurized fluid from a conduit 34 through conduits 36, 38 to opposite ends of a metering piston (not shown) in response to appropriate control signals, one of which may be generated by pilot control throttle lever 33.

In order to minimize the weight of the engine and for purposes of simplification the same fuel used for operation of the engine 10 is made available for use by the servo control 32. For the same reasons fuel may also be utilized by other hydraulically operated control mechanisms, as herein exemplified by a variable stator control 40 which receives pressurized fuel through a conduit 42, which, along with the servo inlet conduit 34, is connected to a second outlet conduit from the fuel pump assembly 12. Pressurized fuel is directed, in response to control signals, through conduits 44, 46 to position a variable stator actuator 48. The actuator 48 is connected to a series of variable angle compressor stator vanes (not shown) through a suitable mechanical linkage 50, shown in simplified form. For a detailed description of a typical linkage used for this purpose see Patent No. 2,999,630 to R .D. Warren et al., assigned to the same assignee as the present invention. The variable stator control 40 receives control inputs from a suitable source to position the stator actuator 48 and the variable stator blades for optimum performance of engine 10.

In operation, fuel is scheduled to the nozzles 24 at a rate set by thrust requirements of an aircraft. As flow to the nozzle 24 increases, an increasing back pressure is generated. This back pressure is reflected in the pressure maintained in conduit 16, which varies from a relative low level at low flow rates to a high level at high flow rates.

Pressure requirements from the variable stator control and the servo control 32 are such that a minimum pressure level is needed at all times for effective operation. At low flow rates to the nozzle means with consequent low back pressures, the pressure required for effective operation on the various control mechanisms is greater than the pressure maintained in pump assembly outlet conduit 16. It is for this reason that the second outlet conduit 52 is provided for the pump assembly 12 so that a sufficient pressure level can be maintained for actuation of the control mechanism.

The fuel pump assembly 12 comprises a booster pump 54, mechanically connected to a main rotor (not shown) of the engine 10 which receives fuel from the inlet conduit 14 and initially pressurizes it for delivery through a conduit 56 and conduits 58, 60 to positive displacement gear pumps 62, 64 respectively. The gear pumps 62 and 64 are also mechanically driven from the rotor of engine 10. The output of gear pump 64 is fed through the outlet conduit 16, through the main fuel control 18 to supply, at least in part, the fuel requirements of engine 10. A pressure relief valve 66 is provided as a safety feature and bypasses fuel from conduit 16 to conduit 28 through a conduit 68 whenever the pressure in conduit 16 exceeds a safe maximum level.

The output of gear pump 62 is fed through a conduit 70 to the outlet conduit 52. A pressurizing valve 72 maintains the pressure in conduit 70 and hence conduit 52 above the level necessary for operation of the various control devices. A conduit 76 connects the pressurizing valve 72 to the main outlet conduit 16. The action of valve 72 is to throttle fuel from a preset level to any lower pressure level which may exist in the main outlet conduit 16 thus maintaining the desired pressure level in the outlet conduit 52.

During engine operation, quite frequently, the rate of flow to the combustor nozzle means will not be proportionate to engine rotor speed, while at other times it will. In the latter case the flow outputs of 62 and 64 will also be at a maximum value. Since there is a maximum rate of fuel flow to the nozzle means, there will likewise be a maximum back pressure reflected in the conduit 16 and likewise in the conduit 70. Under these conditions the combined flow outputs of the pumps 62 and 64 are adequate not only for the demands of the various control mechanisms but also to supply the necessary fuel to the combustor means.

If engine rotor speed remains at or near its maximum value, while fuel flow to the nozzle means 24 is greatly reduced, the action of the pressure regulating valve 26 maintains a relatively low pressure in the conduit 16 while the pressurizing valve 72 maintains the desired pressure level in the conduit 70 by throttling fuel to the lower pressure in conduits 76 and 16. Since only a small fraction of the total fuel delivered by the combined action of the two pumps is throttled, heat input to the fuel is greatly minimized.

To further insure minimum heat input to the fuel while providing the desired pressurization level in the conduit 70, the capacity of pump 62 is chosen so that its flow capacity is sufficient to meet the requirements of the auxiliary control mechanism, i.e., hydraulic system at any engine speed. In this fashion adequate pressurized fuel is provided at all times for actuation of the hydraulic system as well as providing for the maximum flow requirements to the nozzle means 24 when maximum fuel flow is called for. Thus the combined capacities of the two pumps will be selected on the basis of the maximum fuel requirements at any engine speed.

The invention thus described has particular utility in fuel systems for gas turbine engines for supersonic aircraft where the fuel is intended to be used as a heat sink or heat absorber for overall aircraft purposes. In addition the power required by the fuel pumps to pressurize the fuel for hydraulic actuation of the control mechanisms is minimized, thereby allowing an engine to more fully utilize its available power. The invention, however, is not limited to such specific use but may be used in any fuel delivery system for a gas turbine engine where the fuel is to be employed in what may be broadly termed an auxiliary hydraulic system.

Having thus described the invention, what is claimed as novel and desired to be secured by Letters Patent of the United States is:

1. A fuel delivery system for use in a gas turbine engine having a fuel scheduling means requiring a supply pressure and said engine having hydraulically actuated auxiliary devices, said fuel delivery system comprising:
    first and second fuel pumps disposed in parallel and driven by said engine at a rate which increases with an increasing rate of engine operation,
    conduit means receiving the discharge of said first pump for supplying said fuel scheduling means,
    means for supplying the output of said second pump to said auxiliary devices for hydraulic actuation,
    means for maintaining the output pressure of said second pump above a level necessary for effective operation of said auxiliary devices,
    means for supplying the output of said second pump not used by said auxiliary devices from said pressure maintaining means to said conduit means,
    said second pump having a flow output capacity sufficient to meet the maximum requirements of said auxiliary devices and the flow output capacity of said first and second pumps to said fuel scheduling means is sufficient for the maximum flow therethrough,
    whereby when the flow through said scheduling means is relatively low and the rate of engine operation is relatively high, the heat input to the fuel is minimized in providing pressurized fuel for hydraulic actuation of said auxiliary devices and the power required by said fuel delivery system to pressurize said fuel is minimized.

2. A fuel delivery system as in claim 1 wherein,
    said gas turbine engine has nozzle means to which the fuel is supplied, said nozzle means having a back pressure which increases with increases of flow thereto,
    said fuel scheduling means comprises,
    a metering valve receiving the fuel output from said conduit means for scheduling fuel at a predetermined rate to said nozzle means,
    a pressure regulating means for maintaining a constant pressure differential across said metering valve.

No references cited.

JULIUS E. WEST, *Primary Examiner.*